(12) United States Patent
Kanaris

(10) Patent No.: US 7,204,359 B2
(45) Date of Patent: Apr. 17, 2007

(54) SHAFT SUPPORT FOR RESISTING SEPARATION OF A FLEXIBLE CONNECTION

(75) Inventor: Alexander Kanaris, Richmond Hill (CA)

(73) Assignee: Van der Graaf Inc., Brampton, Ontario (CA)

( * ) Notice: Subject to any disclaimer, the term of this patent is extended or adjusted under 35 U.S.C. 154(b) by 0 days.

(21) Appl. No.: 11/182,819

(22) Filed: Jul. 18, 2005

(65) Prior Publication Data

US 2006/0032731 A1    Feb. 16, 2006

Related U.S. Application Data

(63) Continuation of application No. 10/915,411, filed on Aug. 11, 2004.

(51) Int. Cl.
*B65G 13/00* (2006.01)

(52) U.S. Cl. .................. 193/37; 193/35 R; 198/841

(58) Field of Classification Search .............. 198/842, 198/843; 193/35 R, 37
See application file for complete search history.

(56) References Cited

U.S. PATENT DOCUMENTS

| | | | | |
|---|---|---|---|---|
| 4,495,683 A | * | 1/1985 | Delhaes | 193/37 |
| 4,523,674 A | * | 6/1985 | Haugen et al. | 198/843 |
| 4,684,010 A | * | 8/1987 | Hutter et al. | 198/765 |
| 5,645,155 A | * | 7/1997 | Houghton | 193/35 R |
| 5,678,676 A | * | 10/1997 | Pierson | 193/37 |
| 6,367,617 B1 | * | 4/2002 | Schiesser et al. | 198/782 |
| 6,367,619 B1 | * | 4/2002 | Cemke et al. | 198/841 |
| 6,692,000 B2 | * | 2/2004 | Borne et al. | 193/35 R |
| 2005/0205388 A1 | * | 9/2005 | Whipple et al. | 193/37 |

* cited by examiner

*Primary Examiner*—James R. Bidwell
(74) *Attorney, Agent, or Firm*—Eugene J. A. Gierczak

(57) ABSTRACT

A support for supporting the end of a shaft protruding from a conveyor roller for dampening the vibrations of the conveyor roller by providing a flexible connection between spaced first and second supports where the supports include structure for resisting the separation of the rubber. A method of dampening the transmission vibrations of a conveyor roller assembly is also provided.

20 Claims, 6 Drawing Sheets

SHAFT SUPPORT FOR RESISTING SEPARATION OF A FLEXIBLE CONNECTION

This application is a continuation in part of U.S. application Ser. No. 10/915,411 filed on Aug. 11, 2004.

FIELD OF INVENTION

This invention relates generally to supports for conveyor rollers, and particularly relates to providing a shaft support which dampens the vibrations in a conveyor roller, while supporting the shaft of the conveyor roller. This invention also relates to a method of dampening the transmittal of vibrations from a conveyor roller while in operation.

This invention further relates to shaft supports which dampen vibrations in a conveyor roller and which are further designed for increased resistance to shearing or de-lamination resulting from the rotational operation of the conveyor roller.

BACKGROUND ART

A variety of support mechanisms or brackets for mounting, supporting or retaining conveyor rollers to conveyor roller assemblies or systems have heretofore been designed and utilized.

One example of such shaft support mechanism is shown in U.S. Pat. No. 6,367,617 B1. This patent relates to a shaft support comprising of a mounting yoke and a receiving block which is pivotally mounted to the yoke by a pair of pivot pins. The receiving block receives the shaft portion of the roller. The shaft support is pivotable about an axis extending generally along the direction of conveyance of a conveyor. The shaft support is further pivotable about a second axis which extends generally perpendicular.

Other examples of mounting or supporting structures for conveyor rollers can be found in the prior art.

In addition to mounting or supporting a conveyor roller, it is desirable to minimize the vibrations and level of noise produced by a conveyor roller or conveyor assembly in operation. For example, U.S. Pat. No. 4,684,010 shows a vibration conveyor having a working mass drivable in vibrations, a counter mass which is also driven via the working mass in vibrations which are transferred to a support or a mounting base, and a device for dampening or reducing the transmission. The device for dampening or reducing the transmission includes a plurality of roller bearing elements provided between the vibrating conveyor and a mounting base, where each is formed as a unit including two bearing shells with running tracks and at least one roller part between the running tracks. The running tracks before and after the roller part is inclined in opposite direction in form of a predetermined curve, and when the counter mass is driven in rotation the counter mass and the mounting base are pressed from one another by the roller bearing element, which results in dampening relative to the mounting base.

Another example is shown in U.S. Pat. No. 5,645,155 which relates to a conveyor roller noise-isolator and wear-prevention system for mounting a conveyor roller to a conveyor system support frame. An apparatus is provided in which a conveyor roller axle is mounted to a conveyor side frame by a resilient bushing which serves to isolate the noise generated at the roller, to prevent the noise generated at the interface between the axle and the frame, and further to prevent wear on the axle and the frame. The bushing eliminates metal-to-metal contact at the mount interface and by having interference fits with the axle and with the frame to prevent relative motion.

U.S. Pat. No. 5,678,676 relates to the mounting for a roller shaft in the frame of a conveyor designed to reduce the vibration of the shaft and the sound produced during conveyor operation. In several embodiments, the end of the shaft is provided with a taper, and a spring which is internal to the roller is used to bias the taper into the mounting hole. The resulting tight fit of the taper in the hole greatly reduces the vibration energy of the shaft. In another embodiment, a bushing separates the shaft and the hole and is designed to grip the shaft as it is pressed into place in the hole.

It is an object of this invention to provide an improved mechanism for supporting or mounting the shaft of a conveyor roller to the conveyor assembly while effectively reducing the transmittal of vibrations of the conveyor roller, and thus the noise level, produced by the conveyor roller assembly in operation.

It is another object of the invention to reduce the tendency of fastening means to loosen under a vibrational environment.

It is a further object of this invention to provide for a more cost effective, durable and simpler apparatus to support a roller shaft end.

It is a further object of this invention to provide an improved method for dampening of vibrations in a conveyor roller assembly, and thus reducing the overall noise produced by same.

It is a further object of this invention to provide a shaft support with increased resistance to shearing or de-lamination which may be caused when the conveyor roller is in operation.

It is a further object of this invention to provide a shaft support with minimal axial vibration when the shaft support is mounted to a bracket of a conveyor assembly.

DISCLOSURE OF INVENTION

It is an aspect of this invention to provide a shaft support for supporting at least one end of a shaft of a conveyor roller. The shaft support comprises of spaced first and second support; flexible connection structure for connecting the first and second support; the first support including a structure to capture at least one end of said shaft. In one embodiment, the flexible connection is comprised of rubber or the like.

It is yet a further aspect of this invention to provide a roller shaft support for supporting one end of a conveyor roller, at a conveyor having a frame, comprising spaced first and second support means; flexible connection means for connecting said first and second support means; first support means including means to receive said one end of a conveyor roller; and second support means including means for fastening the shaft support to the frame of a conveyor assembly.

It is yet a further aspect of the invention to provide a method of dampening the transmittal of vibrations from a conveyor roller to a conveyor assembly by providing flexible connection means between the conveyor roller and the conveyor assembly.

It is a further aspect of the invention to provide another embodiment of a shaft support having spaced first and second support means; flexible connection means for connecting said first and second support means; said shaft support including means to capture said end of said shaft;

and said shaft support further including means for resisting the separation of said flexible connection means from said support means.

It is a further aspect of the invention to provide a method of dampening the vibrations from a conveyor roller to a bracket comprising the steps of connecting a second support to said bracket; connecting said conveyor roller to a first support; connecting said first and second support by providing rubber between the first and second support means; and providing means for resisting the separation of said rubber from said supports upon rotational displacement of said supports.

These and other objects and features of the invention shall now be described in relation to the following drawings.

BEST MODE FOR CARRYING OUT THE INVENTION

Figure 1:
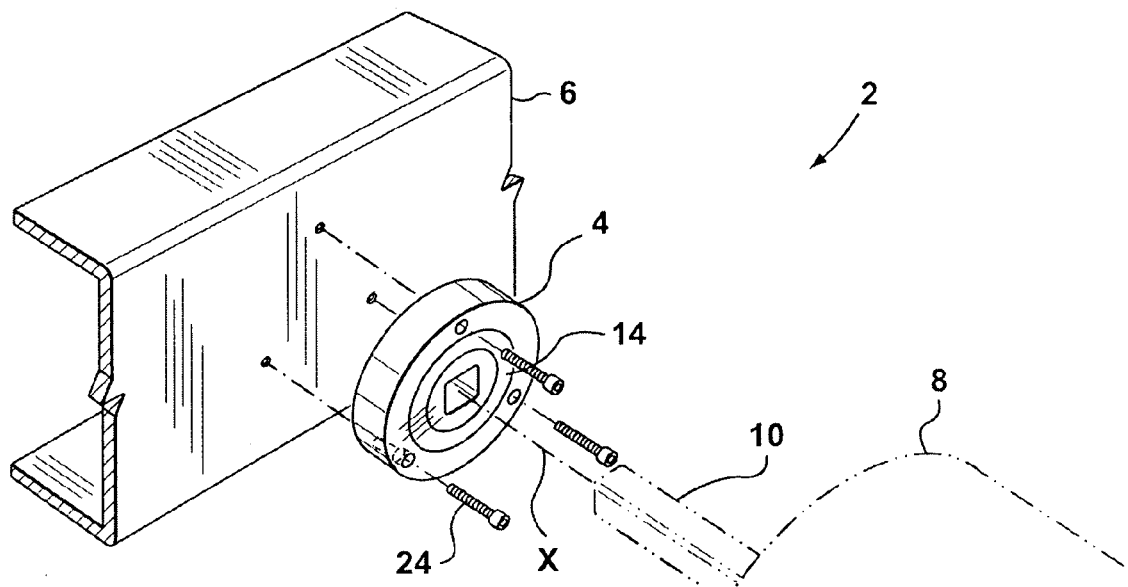
FIG. 1 is an exploded view of the shaft support, the frame and the conveyor assembly.

In the description, which follows, like parts are marked throughout the specification and in the drawings with the same respective reference numerals. The drawings are not necessarily to scale and in some instances proportions may have been exaggerated in order to more clearly depict certain features of the invention.

Figure 2:
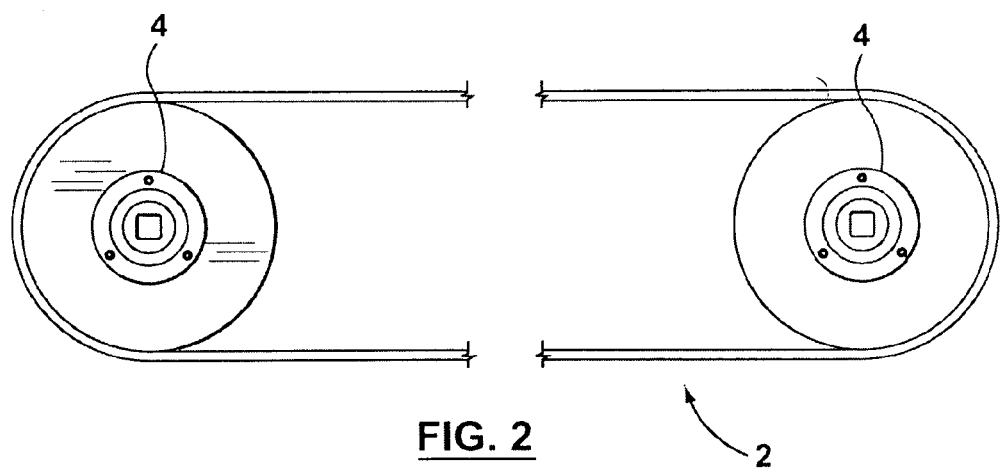
FIG. 2 is a representative side view of the conveyor assembly with the frame removed showing the positioning of the shaft support.

FIG. 1 generally illustrates a conveyor roller assembly 2 comprising of a conveyor roller 8, a shaft support or roller shaft support 4 and a frame 6. The conveyor roller 8 is received and supported by the shaft support 4. While at least one shaft support 4 is required, ideally two shaft supports 4 will be used, one on each end, to support each conveyor roller 8 in a conveyor roller assembly 2. The conveyor roller assembly 2 comprises of at least two conveyor rollers 8 as shown in FIG. 2. Moreover, the invention can be utilized for drum rollers, idler rollers, or the like.

The shaft support 4 in one embodiment may be fastened to the frame 6 of the conveyor roller assembly 2 by fastening means 24. The frame 6 is usually comprised of a rigid material such as steel, aluminium or other suitable materials. The shaft support 4 receives the end of the shaft 10 of the conveyor roller 8 upon insertion of the end of the shaft 10 in the shaft support 4. The shaft support 4 is adapted to retain and support the shaft 10 of the conveyor roller 8. The shaft support 4 includes flexible connection means 16 which acts to dampen the vibrations of the conveyor roller 8 and conveyor roller assembly 2 in operation. This in turn, has the desired effect of reducing the noise level of the conveyor.

FIG. 2 illustrates the conveyor roller assembly 2 having two conveyor rollers 8. The position of the shaft support 4 is shown, with the frame 6 removed. In the preferred embodiment, two shaft supports 4, one to support each end of the shaft 10 of the roller 8, are used to mount and support each roller 8 to the frame 6 of the conveyor roller assembly 2.

Figure 3:
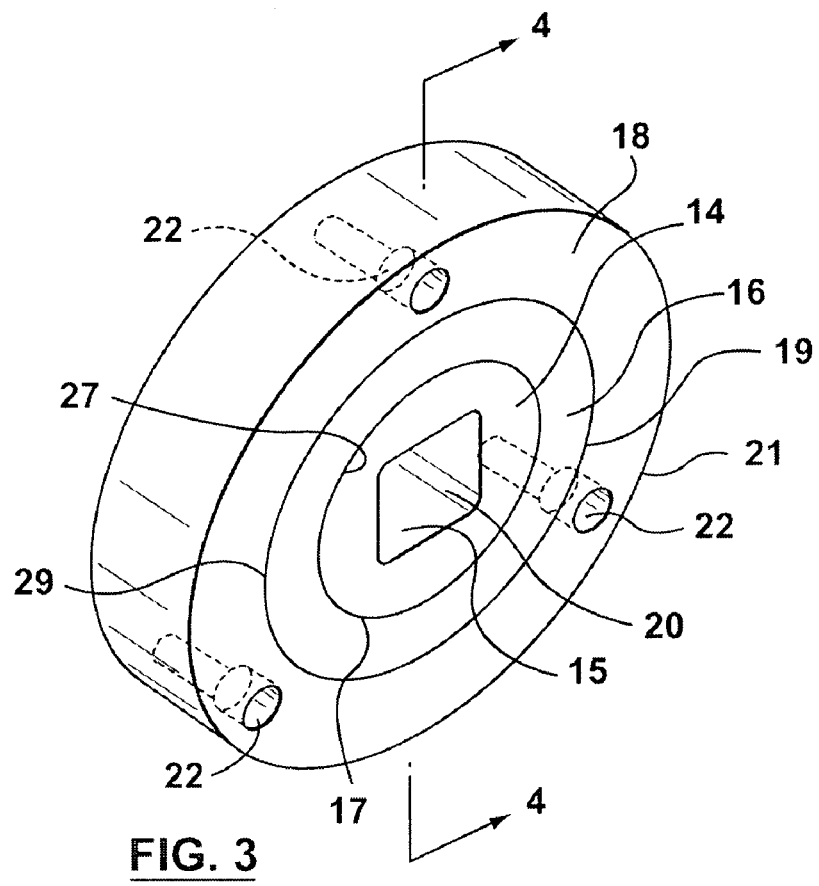
FIG. 3 is a perspective view of the shaft support.

FIG. 3 illustrates the shaft support 4 in isolation. Shaft support 4 comprises of spaced apart first support means 14 and second support means 18. First support means 14 and second support means 18 are usually made of metal or plastic or other materials which can resist wear and corrosion. First and second support means 14 and 18, respectively, are shown as generally circular or disc shaped. However, they can be of various shapes and sizes. Preferably, the first support means 14 and second support means 18 are comprised of the same material, however they may be of different materials without affecting the scope of the invention.

First support means 14 includes means to receive or capture the end of the shaft 10 of the conveyor roller 8 for retaining and supporting the conveyor roller 8. In the preferred embodiment, the first support means 14 includes an aperture 20 which receives the end of the shaft 10. The aperture 20 is preferably formed in a shape generally corresponding to the shape of the end of the shaft 10, which is to be received by the aperture 20. For example, the aperture 20 may be square or hexagonal shaped if the end of the shaft 10 is of such a shape or configuration, but it may be of other shapes. There could be a tight fit between the end of the shaft 10 and the aperture 20 so as to hold the shaft 10 securely in place when the conveyor roller 8 is in operation.

Second support means 18 includes means to capture fastening means 24 to fasten the shaft support 4 to the frame 6 of the conveyor roller assembly 2. The capturing means may be comprised of holes or bores 22 which receive the fastening means 24. The fastening means 24 which are adapted to be received by the holes 22 may include screws, bolts, nails, dowels, or the like.

First support means 14 and second support means 18 are connected together by flexible connection means 16, which is located in between first support means 14 and second support means 18. The flexible connection means 16 is comprised of a resilient material. Advantageously, the flexible connection means 16 is formed of natural or synthetic rubber or a rubber-like material, as such materials provide optimal vibration insulation and absorption qualities. The rubber may be vulcanized. The composition of the flexible connection means 16, for example being rubber, acts to absorb, dampen and reduce the vibrations which are generated by the conveyor roller 8 in operation. The dampening of the vibrations results in a reduction in overall noise produced by the conveyor operation. The flexible connection means 16 may be comprised of a material, other than rubber, which has absorption and insulation qualities.

First and second support means 14 and 18, respectively, and flexible connection means 16 all have a common axis X (see FIG. 1), and in one embodiment are of the same axial thickness.

The first and second support means 14 and 18 are generally annular in shape. First support means 14 has an inner surface 15 defining the aperture 20, and an outer surface 17. The second support means 18 has an inner surface 19 of a first radius and an outer surface 21 of a second radius. The flexible connection means 16 has an inner surface 27 adapted for connection or adherence to the first support means 14 and a second surface 29 adapted for connection or adhesion to the second support means 18. This can be accomplished by vulcanizing or by using an appropriate adhesive.

Figure 4:
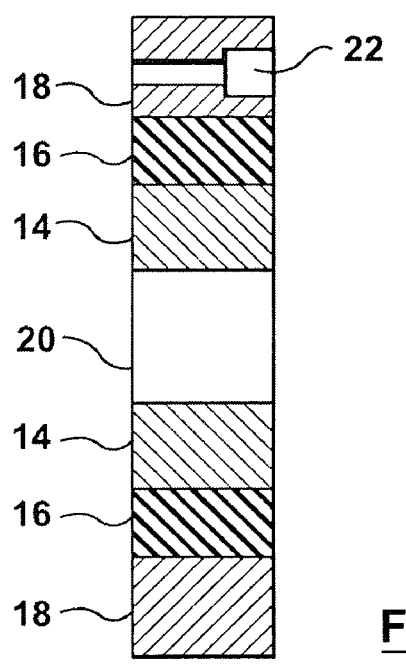
FIG. 4 is a cross-sectional view of the shaft support.

FIG. 4 illustrates the shaft support means 4 in cross section, which shows the first support means 14, the flexible connection means 16, the second support means 18, the aperture 20, and a hole 22.

The invention described herein also defines a method of dampening the transmittal of vibrations from a conveyor roller 8 to a conveyor roller assembly 2 by providing flexible connection means 16 between the conveyor roller 8 and the conveyor roller assembly 2. The flexible connection means 16 is comprised of a material which has vibration absorption and insulation qualities, such as rubber.

The method provides that the flexible connection means 16 is carried by a roller shaft support 4 which is fastened to the frame 6 of the conveyor roller assembly. The roller shaft support 4 is comprised of a first support means 4 and a second support means 18 which are-connected together by the flexible connection means 16. The roller shaft support 4 is adapted to receive the end of a shaft 8 by presenting an aperture 20 within the first support means 14. The roller shaft support 4 carries or supports an end of the shaft 8 which is inserted into the aperture 20 of the first support means 14. In the preferred embodiment, two roller shaft supports 4 are used to support the conveyor roller 8, whereby each end of the conveyor roller 8 is inserted into a shaft support 4, which is fastened to the frame 6 of the conveyor assembly 2.

Figure 5:
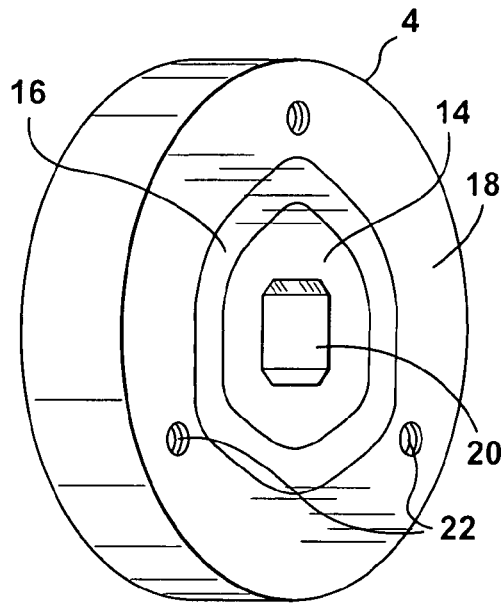
FIG. 5 is a perspective view of a second embodiment of the shaft support.
Figure 6A:
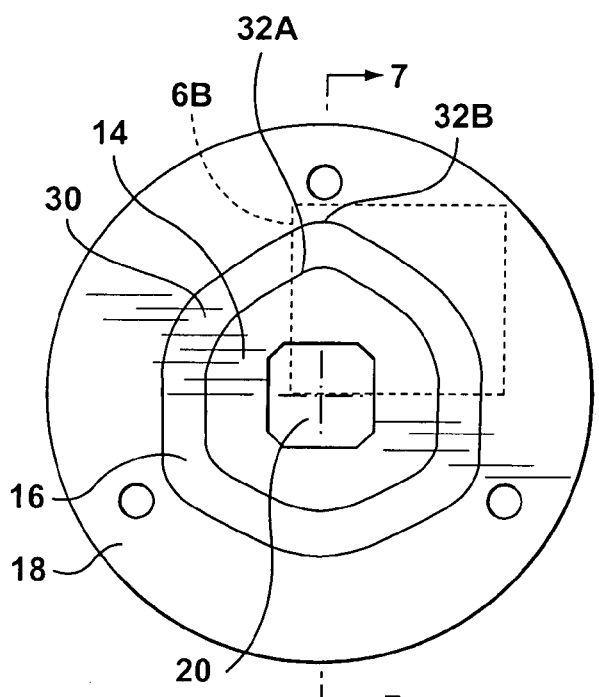
FIG. 6A is a front view of the second embodiment.

FIGS. 5 and 6 illustrate another embodiment of the shaft support 4. Shaft support 4 comprises of spaced apart first support means 14 and second support means 18. Both first support means 14 and second support means 18 are usually made of metal or plastic or other materials which can resist wear and tear. The shaft support 4 further comprises of flexible connection means 16 which connects the first support means 14 and the second support means 18. The flexible connection means 16 is usually made of rubber, although it can be comprised of any resilient material. The rubber is vulcanized. The rubber material is ideal for dampening the transmittal of vibrations from the conveyor roller assembly 2 as it has qualities that absorb, dampen, and reduce the vibrations. Therefore, the overall noise of the conveyor roller 2 in operation is reduced when rubber is provided in the shaft support 4.

Figure 6B:
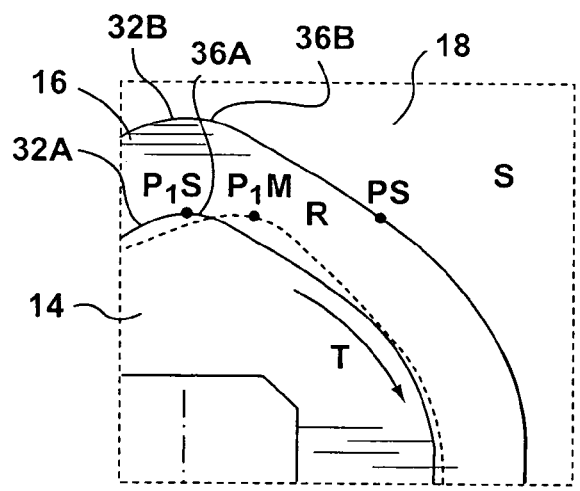
FIG. 6B is a partial exploded view of 6A.

Over time and with continuous use and operation, natural wear and tear will occur at the connection between the rubber and the first and second support means 14 and 18. More particularly, in operation the second support means 18 is bolted to the frame 6 and therefore is relatively fixed; while the first support means 14 is connected to the shaft 10. Accordingly, when the roller 8 rotates, it can impart rotational force or torque T as shown in FIG. 6B, Over time, the torque (T) or the force that produces the rotation may cause the flexible connection means 16 to separate or shear apart from outer surface 32A of the first support means 14 and the inner surface 32B of the second support means 18.

In order to reduce the de-lamination or shearing, the shaft support 4 further includes resistance means 30 or means for resisting the separation of said flexible connection means 16 from the first and second support means 14 and 16 which results from the rotational operation of the conveyor roller 2, and particularly from the relative displacement of the first and second support means 14 and 18. The embodiment shown in FIGS. 5 and 6 is designed for increased resistance to shearing or de-lamination. The second support means 18 includes holes 22 adapted to receive fastener 24 for mounting or fastening said shaft support 4 to the frame 6 of the conveyor roller assembly.

The shaft support 4 includes resistance means 30 for increasing the resistance of separation of the flexible connection means 16 from the first and second support means 14 and 18. In this embodiment, the resistance means 30 is carried by at least one of the supports 14 and 18. The second support means 18 defines an inner surface 32B and the first support means 14 defines a corresponding outer surface 32A, which is spaced from said inner surface 32B as shown.

At least one shaped region 36A is presented by the outer surface 32A. However, there may be more than one shaped region 36A presented by the outer surface 32A. Furthermore, the inner surface 32B may also present corresponding shaped regions 36B, so that the inner and outer surfaces 32B and 32A, respectively, present one or more pairs of corresponding shaped regions 36A and 36B. In our embodiment, the corresponding shaped spaced regions 36A and 36B are cammed surfaces. Alternatively, the shaped surfaces 36A and 36B may be parabolic. It is possible that the outer surface 32A presents a cam shaped region 36A, while the inner region 32B presents a curved or circular region, which is not cam shaped. However, preferably, both the outer surface 32A and inner surface 32B will present at least one pair of cam shaped regions.

The shaped regions 36A and 36B act to trap or compress the rubber flexible connection means 16 between said inner 32B and outer surfaces 32A when one of the supports 14 or 18 is rotatably displaced relative said other support during operation of the conveyor roller 8 as illustrated in FIG. 6B. The compression or compaction of the rubber inhibits the separation action and the shearing apart of the rubber from other areas of the shaft support, namely from the first support means 14 and the second support means 18. Any shaped regions 36A and 36B may be used provided that the regions resist separation as previously disclosed. More particularly, FIG. 6B shows that upon the application of a torque T the shaped regions 36A of the first support means 14 will tend to move to the position shown by the dotted line, from P1 S to P1 M, where the region R will present the resilient material under compaction or which is compressed thereby resisting shearing as previously described. Portion PS will remain relatively fixed since second support means is secured to the frame by fasteners 24 as previously described. PS indicates the surface of the flexible connection means 16 which remain stationary. The distance from the surface PS of the flexible connection means 16 decreases as the shaped region 36A moves from position P1 S to P1 M, thereby resulting in compression of flexible connection means 14 in the region R.

Figure 7:
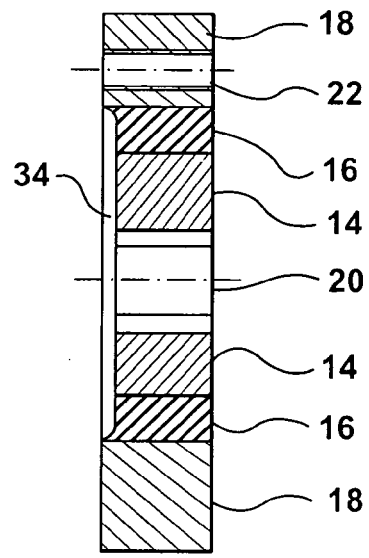
FIG. 7 is a cross-sectional view of FIG. 6A.
Figure 9:
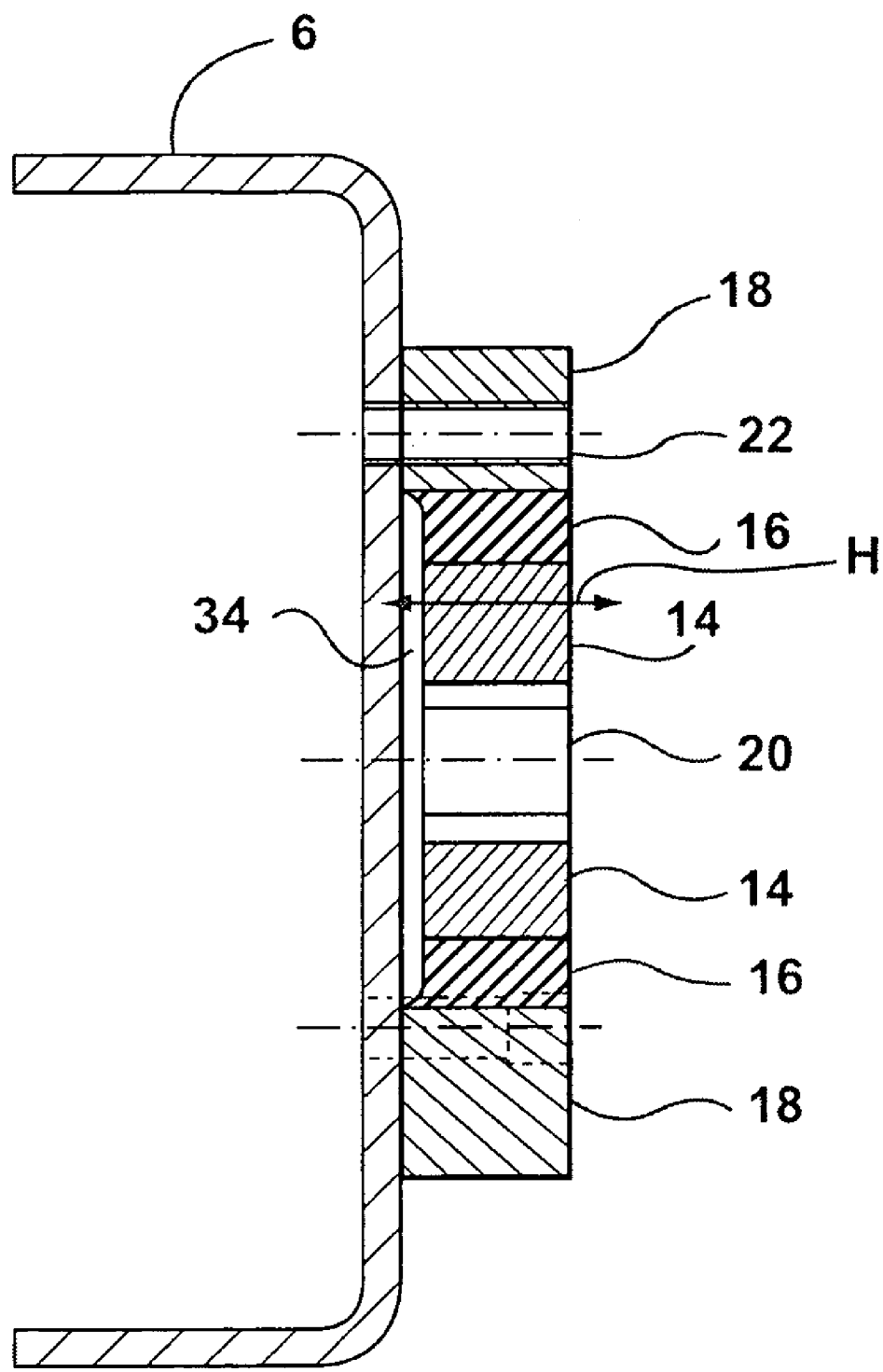
FIG. 9 is a cross-sectional view of the shaft support shown mounted on the frame of the conveyor roller assembly.

FIG. 7 illustrates the shaft support 4 in cross section, which shows the first support means 14, the flexible connection means 16, the second support means 18, the aperture 20, and a hole 22. Furthermore, indent or clearance 34 is also shown, which is further illustrated in FIG. 9. More particularly, the clearance, spacing or undercut 34 is utilized so as to provide clearance between the first support means 14 from the frame 6 in the assembled form as shown in FIG. 9. In other words, as the first support means 14 vibrates in three dimensions, there will be a horizontal component H of vibration as shown in FIG. 9. By providing a clearance 34 there will be less chance of the first support means 14 banging into the frame 6.

FIG. 9 illustrates the cross section of the shaft support 4 mounted to the frame 6 of the conveyor roller assembly 2. The first support means 14 may be recessed or indented to provide a clearance 34 when said shaft support 4 is mounted to the frame 6 of the conveyor roller assembly 2. In the absence of the clearance 34, the first support means 14 of the shaft support 4 will touch the conveyor frame 6 and vibrations will be transmitted axially when the conveyor roller 8 is in operation. The flexible connection means 16 may also be indented or recessed to provide a further clearance 34, however this is not necessary as the rubber of the flexible connection means 16 will absorb some of the operational vibrations if it touches the frame 6 during operation. The embodiment shown in FIG. 9 further reduces the transmittal of vibrations of a conveyor roller 8 while in operation.

Figure 8:
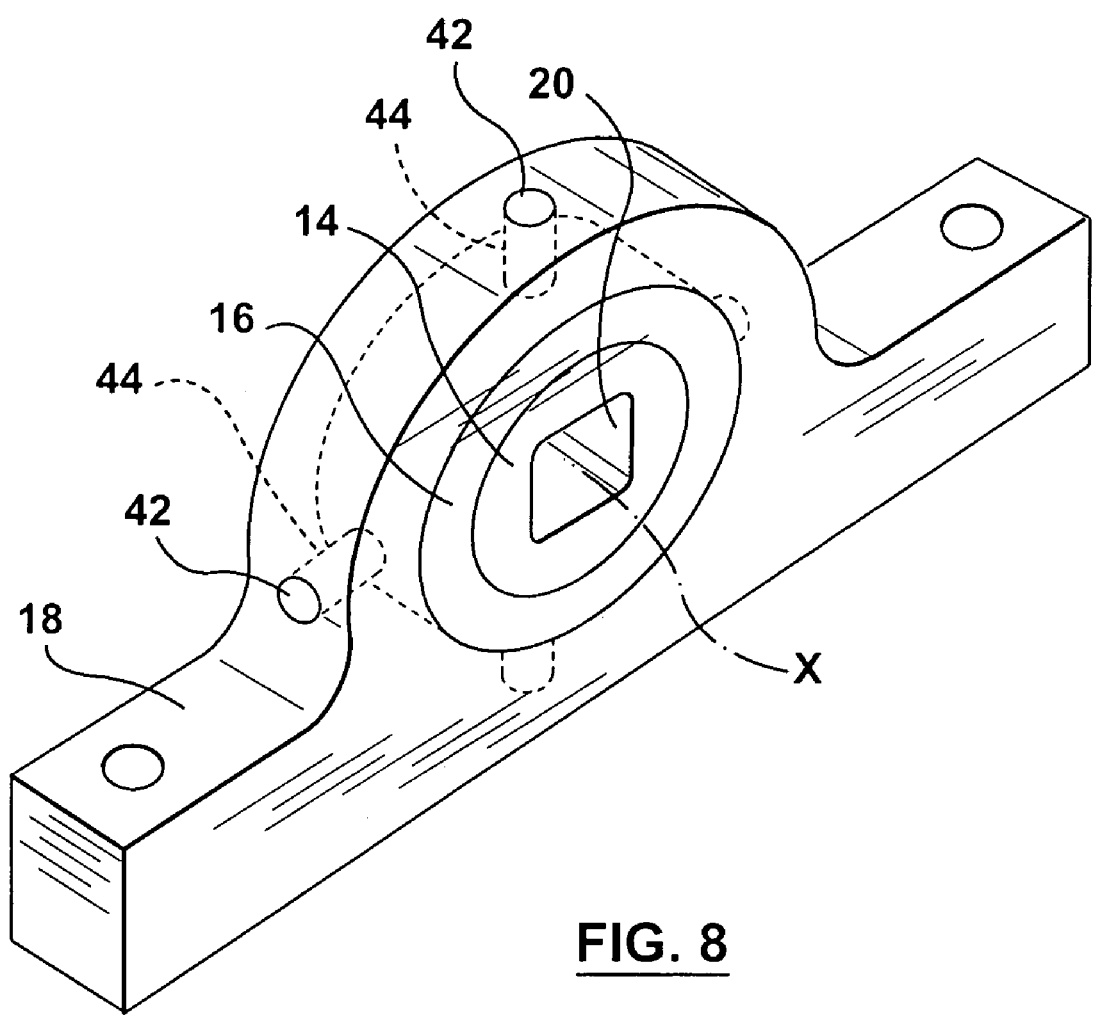
FIG. 8 is perspective view of a third embodiment of the shaft support

FIG. 8 illustrates another embodiment of the invention. In this embodiment the second support means 18 includes at least one passageway 42 extending inwardly into the second support 18 and which communicates with the flexible connection means 16. The flexible connection means 16 has at least one extension 44 which extends from the flexible connection means 16 to be disposed or received by the passageway 42. There may be a plurality of passageways 42, and the number of extensions 44 generally corresponds to the number of passageways 42. The passageways 42 in one embodiment extend radially inwardly. The material of the extensions 44 is the same material as the flexible connection means 16, and is preferably rubber. The rubber is received by the one or more passageways 42, and will flow when vulcanized.

The passageways 42 and the extensions 44 work together to anchor the flexible connection means 16 within the shaft support 4. Since the extensions 44 are usually rubber, the same material as the flexible connections means 16, the surface area of rubber increases as the rubber flows into the passageways 42. This anchoring of the flexible connection means 16 assists to resist separation of the rubber flexible connection means 16 from the shaft support means 14 and 18, when one said shaft support means 14 or 18 is rotatably displaced relative to said other shaft support means during operation of the conveyor roller 2 as previously described. As a result, shearing or de-lamination of the rubber from the shaft support 4 is reduced.

The shaft support 4 includes means to capture the end of the roller shaft 10. In the embodiment shown, the means to capture comprises of aperture 20. The aperture 20 is usually located in the first support means 14, and is formed in a shape generally corresponding to the shape of the end of the shaft 10 to be received. The aperture 20 retains and supports the conveyor roller shaft 10.

Figure 10:
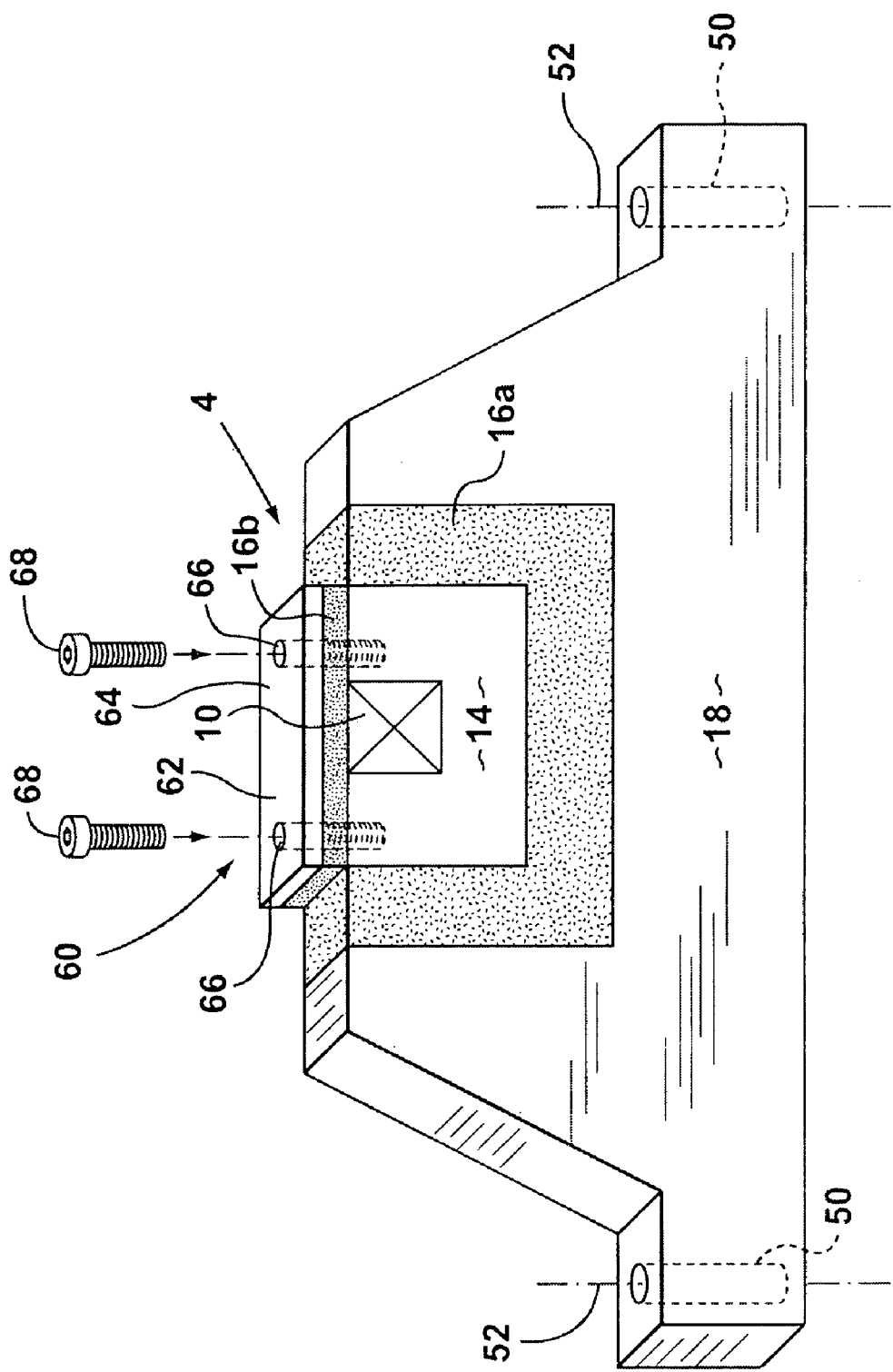
FIG. 10 is a perspective view of another embodiment of the invention.

FIG. 10 illustrates a further embodiment to the invention illustrating a shaft support 4 for receiving the end of the shaft 10 which is illustrated in a representative form.

The shaft support 4 includes flexible connection means 16a and 16b which acts to dampen the vibrations of the conveyor roller 8 (not shown).

The shaft support 4 comprises of spaced apart first support means 14 and second support means 18. In the embodiment shown in FIG. 10 the second support means comprises of a bracket 18 which includes two holes 50 adapted to receive fasteners 52 so as to anchor the bracket to a conveyor roller assembly. As before the first support means 14 and second support means 18 are usually made of metal or plastic or other materials than can resist wear or corrosion.

The first and second support 14 and 18 respectively are shown as generally rectangular shaped.

Again the first support means 14 includes means to receive or capture the end of the shaft 10 as shown.

The first support means 14 and second support means 18 are connected together by flexible connection means 16a and 16b. The flexible connection means 16a and 16b are formed of natural or synthetic rubber or rubber like material to provide optimal vibration insulation and absorption qualities. The rubber may be vulcanized. The composition of flexible connection means 16a and 16b, for example rubber acts to absorb, dampen and reduce the vibrations which are generated by the conveyor roller in operation.

In the embodiment shown in FIG. 10 the second support means 18 includes shaft retention means 60. In particular the shaft retention means 60 comprises of a retention plate 62 which has on one surface thereof a flexible connection means 16b and the opposite surface thereof a rigid plate or portion 64 comprised of metal, plastic or the like. The opposite plate surface 64 includes holes 66 which are adapted to receive fasteners 68 for fastening the shaft retention means 64 to the second support means 18.

The flexible connection means 16a and 16b are comprised of these separate parts.

Various embodiments of the invention have now been described in detail.

Since changes in and/or additions to the above-described best mode may be made without departing from the nature, spirit or scope of the invention, the invention is not to be limited to said details.

I claim:

1. A support for supporting at least one end of a shaft protruding from an end of a roller, comprising:
   (a) co-axially spaced first and second support means;
   (b) flexible connection means for connecting said first and second support means;
   (c) said first support means including means to capture said end of said shaft protruding from said end of said roller;
   (d) and said one of said support means including means for resisting the separation of said flexible connection means from said support means.

2. A support as claimed in claim 1 wherein said means for resisting comprises means for resisting the rotational separation o said flexible connection means from said first and second support means.

3. A support as claimed in claim 1 wherein said flexible connection means is comprised of a resilient material.

4. A support as claimed in claim 3 wherein said resilient material of said flexible connection means comprises rubber for dampening the transmittal of vibrations and is generally located between the first and second support means of said shaft support.

5. A support as claimed in claim 3 wherein one of said first and second supports defines an outer surface and said other support defines an inner surface spaced from said outer surface, and said resisting means is carried by at least one of said inner and outer surfaces.

6. A support assembly as claimed in claim 3 wherein said inner and outer surfaces assist in trapping said rubber between said inner and outer surfaces when one of said supports is rotatably displaced relative said other support.

7. A support as claimed in claim 6 wherein said resisting means comprises said inner and outer spaced surfaces including at least one pair of radially spaced corresponding shaped regions adapted to compact said rubber between said inner and outer spaced surfaces upon relative displacement of said first and second supports so as to resist separation of said rubber from said supports.

8. A support as claimed in claim 5 wherein said resisting means a cammed region radially carried by said inner and outer spaced surfaces for compressing said rubber therebetween upon relative displacement of said first and second supports.

9. A support as claimed in claim 1 wherein said means to capture said end of said shaft is formed in a shape generally corresponding to the shape of said shaft end to be received.

10. A support as claimed in claim 1 wherein one of said first and second support means includes holes for receiving fastening means to fasten said shaft support to a conveyor roller assembly.

11. A support as claimed in claim 1, wherein one of said first or second support means includes at least one passageway which communicates with said flexible connections means.

12. A support as claimed in claim 11 wherein said passageway receives rubber.

13. A support as claimed in claim 11 wherein at least one extension extends outwardly from said flexible connection means to be disposed within said at least one passageway.

14. A support as claimed in claim 13 wherein said at least one extension is adapted to anchor said flexible connection means upon relative rotational displacement of said first and second supports so as to resist separation of said rubber flexible connection means from said supports.

15. A support as claimed in claim 11 wherein said second support means has a plurality of passageways, and said flexible connection means has a plurality of extensions disposed within said passageways.

16. A support as claimed in claim 11 wherein said means to capture said end of shaft is an aperture in said first support means said aperture is formed in a shape generally corresponding to the shape of said shaft end to be received by said aperture of said second support means.

17. A support as claimed in claim 1 wherein said first support means is recessed to provide a clearance when said shaft support is mounted to a conveyor roller assembly.

18. A method of dampening the transmittal of vibrations from a conveyor roller having at least one shaft extending outwardly from said conveyor roller, for registration with a bracket comprising the steps of:
   (a) connecting said one end of said shaft extending outwardly from said conveyor roller to a first support;
   (b) connecting a second support to said bracket;
   (c) connecting said first and second support by providing rubber between the first and second support means; and
   (d) providing means for resisting the separation of said rubber from said supports upon rotational displacement of said supports.

19. A method as claimed in claim 18 including the step of compacting a portion of the rubber between the opposed first and second support means so as to resist the separation of the surfaces.

20. A method as claimed in claim 18, wherein said rubber extends into at least one passageway disposed into said second support means.

* * * * *